June 4, 1929.  I. SAGNIER  1,715,471

APPARATUS INDICATING AVERAGE SPEED FOR VEHICLES

Filed Oct. 29, 1926  2 Sheets-Sheet 1

Inventor
Ignacio Sagnier
By J. D. Singer, Atty

Patented June 4, 1929.

1,715,471

UNITED STATES PATENT OFFICE.

IGNACIO SAGNIER, OF BARCELONA, SPAIN.

APPARATUS INDICATING AVERAGE SPEED FOR VEHICLES.

Application filed October 29, 1926, Serial No. 145,088, and in Spain April 24, 1926.

The drivers of motor-cars and of vehicles in general have always been interested in knowing, not only the speed attained at any given moment, but also the average speed obtained over a certain distance. This has hitherto been obtained by dividing the distance covered by the time spent in covering the same, an operation that, in addition to being troublesome, frequently gives rise to errors.

The errors that may be caused by these apparatuses, even when they are working in conditions that compare unfavourably with what is ordinarily required of them, are not such as to appreciably affect the result, and the total absence of any speed-indicating mechanism, which is always liable to errors, is worthy of note.

The object of the invention is to provide improved apparatus which shows continuously by means of a marker running along a graduated limb the average speed corresponding to the distance covered from a given point or instant and which apparatus saves work and at the same time attains the precision peculiar to a machine based on two mechanisms that are recognized to be exact, that is to say a chronometer and a mileage recorder.

With the above and other objects in view, my invention consists in the construction, combination and arrangement of devices hereinafter described and claimed.

In the accompanying drawings—

Figure 1:
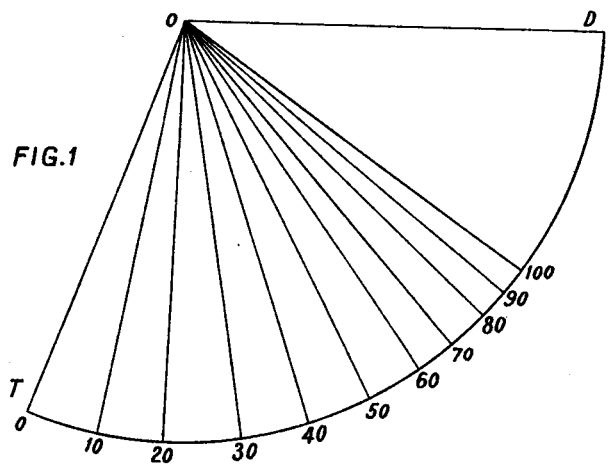
Figure 1 is a diagram of a graph for use in connection with my improved apparatus.

The end of a stylet E moves in a plane, simultaneously in two directions, which give the corresponding resultant; these directions are parallel to two coordinate axes situated in the said plane, the origin of which axes may be called 0 (see Figure 1).

The distances covered by the stylet, parallel to an axis T, are proportional to the time, and the distances parallel to the other axis D, are proportional to the distances covered in kilometres. In practice this proportionality is secured by means of a mechanism similar to a time measuring apparatus and of a kilometer-recorder or other like mechanism.

Thus the stylet will pass over the different points of the plane, to each of which will correspond a space traversed and a time spent in traversing it, and thereby an average.

It will be seen that, if the stylet starts from the point 0, the points of like average will correspond to straight lines forming a sheaf and all concurrent at the origin 0.

Thus, a needle rotating round an axis projected at the origin 0 and constantly following the stylet, will in succession coincide with the straight lines forming the sheaf and, if at the intersection of the circle traced by the end of the needle and the straight lines of the sheaf, we place the numbers corresponding to the averages, the needle will always be on the number showing the average that is sought.

In Figure 1 are shown the axes T and D forming an angle greater than 90 degrees, and the straight lines of like average, which have been traced on the figure on the supposition that a minute and a kilometre are represented by the same measurement on the respective axes. The graph is adequate for a distance of 300 kilometres and a time of 5 hours as a maximum run.

*Detailed description of the apparatus.*

Figure 2:
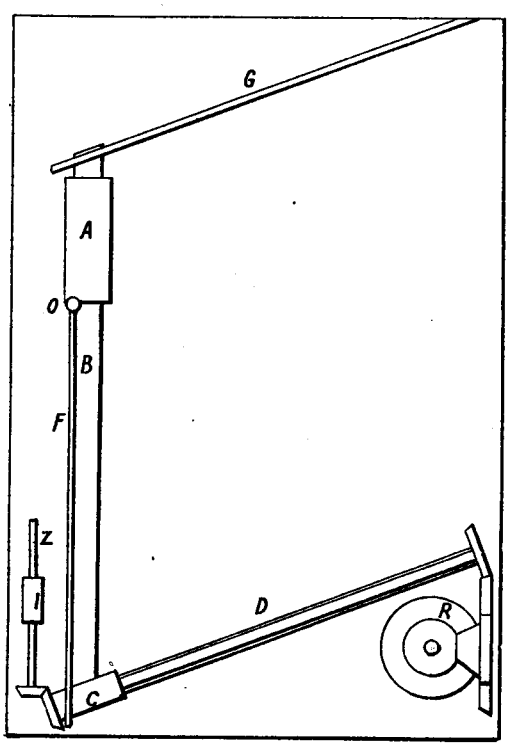
Figure 2 is an elevation of my improved apparatus.

The two axes of times and spaces covered are given material shape in the form of the parts B and D (Figure 2). They might form any angle, but the angle shown on the drawing is the most suitable.

Part B (Figures 2 and 3) is a rack, with which the wheel K (Figure 3) forming part of the clockwork apparatus A (Figures 2 and 3) engages; by the rotation of the wheel the apparatus A moves along the part B.

Matters are so arranged that by bringing A to the top of B, the clockwork is wound up; thereby the spring is able to move A to the bottom of B in a suitable space of time.

Figure 3:
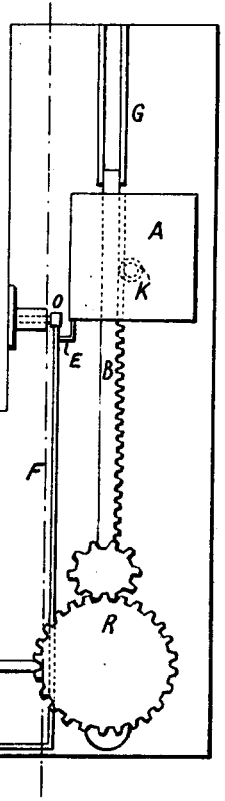
Figure 3 is a similar view at right angles to Figure 2.
Figure 5:
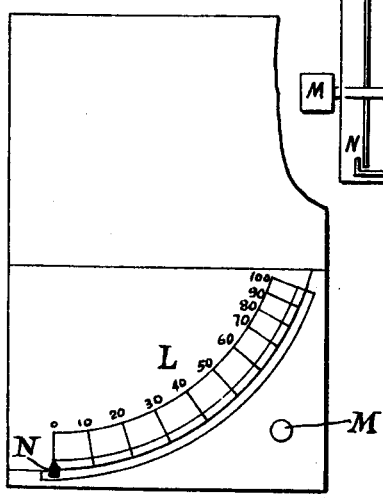
Figure 5 is a detail elevation of the segmental limb N with which the stud M cooperates.

B at the bottom carries a sleeve C (Figure 2) threaded internally, and through the inside of this sleeve passes an axis D (Figure 2), fitted with the corresponding screw. By the rotation of D, B is made to move in the required direction as it is prevented from rotating by the guide-pieces G (Figures 2 and 3).

Rotation is communicated to D by the axis

Z (Figure 2), which rotates at a speed proportional to the space traversed by the vehicle. The continuation of Z is not shown on the plan; it should be connected to a kilometer recorder or like instrument, the detailed arrangement of which may be made to suit each particular case, bearing in mind that the whole of the apparatus is projected on the attached drawing, so as to leave sufficient space available to enable other apparatus, such as speedometers, mileage-recorders, clocks, etc., to be included in one sole block.

The stylet E mentioned above may be fixed at any point on A (Figure 3). The needle F (Figures 2 and 3) rotates around the axis 0 (Figures 2 and 3) and its section is shaped in the form of an U, inside which the stylet is introduced to guide the needle. Other arrangements may be used to make the needle follow the stylet. Point 0 refers to the origin of the coordinates.

As the stylet should start from the point 0 and this is not possible materially as, if the point of the stylet coincides with the axis of rotation, the position of the needle would not be fixed, the stylet may be displaced with regard to A, in the direction of T the time-axis, so that its distance from the axis 0 should not be less than a measure fixed by a stop; a small spring action on the stylet, restores it to its position when the action of the stop ceases. This means that the movement of the stylet with regard to T is delayed with respect to that of A by a suitable space of time, which in practice has the effect that the apparatus does not mark what it should mark until a few minutes have elapsed.

Figure 4:
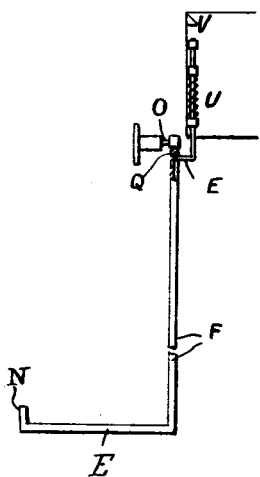
Figure 4 is a detail elevation partly in section showing the needle, the stylet and coacting devices.

Figure 4 is a detail drawing of the connection of the stylet to A, Q being a stop forming one piece with the needle, V another stop determining the normal position of the stylet, and U the spring already mentioned.

It follows from the above that each position of the needle will refer to a certain average; there are many ways of obtaining the indication practically, one of them being to give F (Figure 3) the form shown, whereby its end N (Figure 3) will run along a limb L. The end N thus serves to indicate the average speed. My improved apparatus does not include a recorder. It operates simply as an indicator.

This special arrangement has the object of leaving the necessary space for other mechanisms, if required.

The graduation of the limb of the apparatus depends on the relation of speeds of A over B and C over D, and will be shown in kilometres per hour or miles per hour, according as required.

The apparatus is brought to the starting point by working first the stud M (Figure 3), which by means of the gear R (Figures 2 and 3) brings C to its original position, when the needle will mark zero, and afterwards by raising A to its initial position.

A device I (Figure 2) is fitted, which is merely a friction coupling to enable the axes Z and D to rotate independently.

What I claim is:—

An apparatus indicating average speed, for vehicles, characterized by the coupling of a clock or other apparatus producing movements proportional to time, with a kilometer indicator or other like apparatus, in such manner that they may cause relative movements of a surface and a point, according to directions corresponding to the axes of a system of Cartesian, polar or other coordinates whatsoever represented on a graph, said apparatus comprising a stylet which by its form maintains in constant contact with it a needle, which rotates around an axis and which, whilst always having two fixed points, viz, its intersection with the said axis and the point of contact with the stylet, takes up certain positions, each of which correspond to an average indication shown on a limb graduated in kilometres per hour or miles per hour.

In testimony whereof he has signed his name to this specification.

IGNACIO SAGNIER.

CERTIFICATE OF CORRECTION.

Patent No. 1,715,471. Granted June 4, 1929, to

IGNACIO SAGNIER.

It is hereby certified that error appears in the printed specification of the above numbered patent requiring correction as follows: Page 1, in the heading to the printed specification, line 5, date of filing application in Spain, for "April 24, 1926" read "April 26, 1926"; and that the said Letters Patent should be read with this correction therein that the same may conform to the record of the case in the Patent Office.

Signed and sealed this 6th day of August, A. D. 1929.

(Seal)

M. J. Moore,
Acting Commissioner of Patents.